(12) United States Patent
Choi

(10) Patent No.: US 7,239,101 B2
(45) Date of Patent: Jul. 3, 2007

(54) A/V MONITOR MOUNTING STRUCTURE FOR VEHICLE

(75) Inventor: Young Rok Choi, Seoul (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 0 days.

(21) Appl. No.: 11/300,166

(22) Filed: Dec. 13, 2005

(65) Prior Publication Data

US 2007/0108926 A1    May 17, 2007

(30) Foreign Application Priority Data

Nov. 11, 2005    (KR) ...................... 10-2005-0107992

(51) Int. Cl.
*B60N 2/02* (2006.01)
*F16M 11/00* (2006.01)
*A47F 5/00* (2006.01)

(52) U.S. Cl. ........................ 318/280; 318/16; 318/17; 318/560; 345/7; 345/204; 349/2; 349/585; 248/125.2; 248/917

(58) Field of Classification Search ................ 318/800, 318/430, 434, 560, 280, 286; 345/204, 7, 345/87, 905, 2, 11; 349/2, 11, 585; 248/125.2, 248/917; 312/319.6, 7.2, 14
See application file for complete search history.

(56) References Cited

U.S. PATENT DOCUMENTS 5,096,271 A * 3/1992 Portman ...................... 312/7.2
5,173,686 A * 12/1992 Fujihara ........................ 345/87
5,362,144 A * 11/1994 Shioya et al. ............. 312/319.6
6,011,685 A *  1/2000 Otsuki ......................... 361/679
6,352,226 B1 * 3/2002 Gordon ................... 248/125.2
6,583,773 B1 * 6/2003 Nogami et al. ................. 345/7
6,831,708 B2 * 12/2004 Tajima ......................... 349/11
2002/0008790 A1 * 1/2002 Tajima ........................... 349/2
2002/0126110 A1 * 9/2002 Bowron ....................... 345/204

FOREIGN PATENT DOCUMENTS

| JP | 10-038593 | 2/1998 |
|---|---|---|
| JP | 2001-030846 | 2/2001 |
| JP | 2003-231425 | 8/2003 |
| JP | 2003-240012 | 8/2003 |

* cited by examiner

*Primary Examiner*—Paul Ip
(74) *Attorney, Agent, or Firm*—Morgan Lewis & Bockius LLP

(57) ABSTRACT

An A/V monitor mounting structure for a vehicle allows a monitor installed on a center console of a vehicle to be received in the center console so that the monitor can be extended out of and retracted into the center console as the occasion demands. The A/V monitor mounting structure includes a motor driven in a clockwise or counterclockwise direction when power is applied thereto from an external power source, an operation section installed on a lower end of a rear surface of a monitor to raise and lower the monitor, a gear section for transmitting power from the motor to the operation section, and a clutch section for retarding a moving velocity of the monitor when the monitor is moved upward and downward.

2 Claims, 5 Drawing Sheets

A/V MONITOR MOUNTING STRUCTURE FOR VEHICLE

CROSS-REFERENCE TO RELATED APPLICATION

This application claims priority to and the benefit of Korean Patent Application 10-2005-0107992 filed in the Korean Intellectual Property Office on Nov. 11, 2005, the entire content of which is incorporated herein by reference.

BACKGROUND OF THE INVENTION

1. Field of the Invention

The present invention relates to an A/V monitor mounting structure for a vehicle, and more particularly to an A/V monitor mounting structure for a vehicle, which allows a monitor installed on a center console of a vehicle to be received in the center console so that the monitor can be extended out of and retracted into the center console as the occasion demands.

2. Description of the Prior Art

As is generally known in the art, in order to improve a driver's convenience while a vehicle travels on a road, an audio/video (A/V) monitor is installed on a crash pad which is provided in front of a front seat in a passenger compartment of the vehicle.

Referring to FIG. 1, an audio/video monitor is installed on a center panel which is provided to the center portion of a crash pad 2 and on which air-conditioning control switches, audio switches, etc., are also installed. Since the A/V monitor is usually installed adjacent to an audio system, the A/V monitor inevitably has a limited size. Further, because a driver or a passenger must bend forwards the upper part of his or her body forward and implement the necessary manipulations to operate the A/V monitor, safe driving of the vehicle cannot be ensured.

In order to cope with these problems, an A/V monitor mounting structure for a vehicle as shown in FIG. 2 has been disclosed in the art. In this A/V monitor mounting structure, an opening is defined at the right side of an instrument panel, and an A/V monitor is installed in the opening, so that a driver or a passenger can implement necessary manipulations without bending the upper part of their body.

While this type of A/V monitor mounting structure can be applied to a large-sized vehicle which has a crash pad capable of accommodating the size of the monitor, it is difficult to properly mount the monitor in a small-sized vehicle. Also, a drawback is caused in that, because the monitor is installed on the center portion of the crash pad, space utilization efficiency on the crash pad inevitably deteriorates.

In order to solve these problems, an A/V monitor mounting structure for a vehicle as shown in FIG. 3 has been suggested in the art. In this A/V monitor mounting structure, a monitor is coupled to a crash pad 2 by hinges, so that the monitor can be pivoted to a display position through manipulation by a user.

Nevertheless, this type of A/V monitor mounting structure still encounters a problem in that, since a front windshield glass is installed to be inclined with respect to a vertical plane, the space between the crash pad and the front windshield glass is narrow, and therefore, the size of the monitor inevitably decreases.

SUMMARY OF THE INVENTION

Accordingly, the present invention has been made to solve the above-mentioned problems occurring in the prior art, and an object of the present invention is to provide an A/V monitor mounting structure for a vehicle, which allows a monitor for a vehicle to be raised and lowered to thereby be extended out of and retracted into a crash pad and minimizes noise generation while the monitor is retracted into the crash pad.

In order to achieve the above object, according to one aspect of the present invention, there is provided an A/V monitor mounting structure for a vehicle, including a motor driven in a clockwise or counterclockwise direction when power is applied thereto from an external power source; an operation section installed on a lower end of a rear surface of a monitor to raise and lower the monitor; a gear section for transmitting power from the motor to the operation section; and a clutch section for retarding a moving velocity of the monitor when the monitor is moved upward and downward.

According to another aspect of the present invention, the operation section includes a monitor fastening member which is formed in the shape of a rectangular parallelepiped, first and second balance rods which are respectively installed adjacent to both ends of the monitor fastening member to extend in a vertical direction, and a moving rod which is formed with a thread on an outer surface thereof and is installed through a center portion of the monitor fastening member.

According to another aspect of the present invention, the moving rod is threadedly coupled through a center portion of the operation section.

According to another aspect of the present invention, first and second balance rods are installed parallel to the moving rod.

According to another aspect of the present invention, a separation between the moving rod and the first balance rod is the same as that between the moving rod and the second balance rod.

According to still another aspect of the present invention, the gear section includes a worm gear installed on a rotation shaft of the motor, a worm wheel meshed with the worm gear, a first spur gear installed along with the worm wheel on the same shaft, a second spur gear meshed with the first spur gear, a third spur gear installed along with the second spur gear on the same shaft to be rotated integrally therewith, a fourth spur gear installed on a rotation shaft of the operation section and meshed with the second spur gear to transmit rotation force to the rotation shaft of the operation section, and a fifth spur gear meshed with the third spur gear to transmit rotation force to the clutch section.

According to yet still another aspect of the present invention, the clutch section includes an upper rotation gear meshed with the fifth spur gear of the gear section to be rotated and moved upward and downward, a lower rotation gear installed along with the upper rotation shaft on the same shaft to receive rotation force from the upper rotation gear through a friction clutch and to thereby be rotated, and a spring installed on the rotation shaft of the lower rotation shaft to apply elastic force to the lower rotation gear.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF THE PREFERRED EMBODIMENTS

Figure 1:
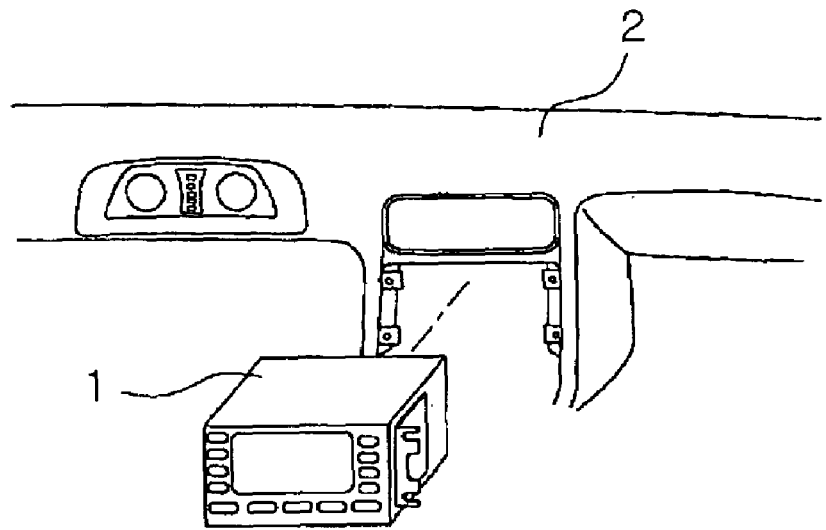
FIGS. 1 through 3 are perspective views illustrating conventional A/V monitor mounting structures for a vehicle.
Figure 2:
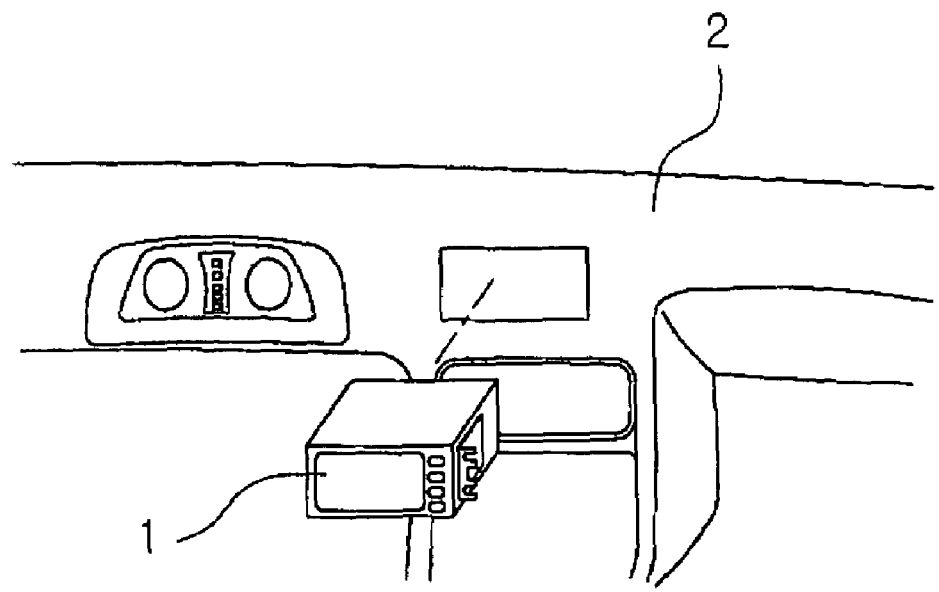
Figure 3:
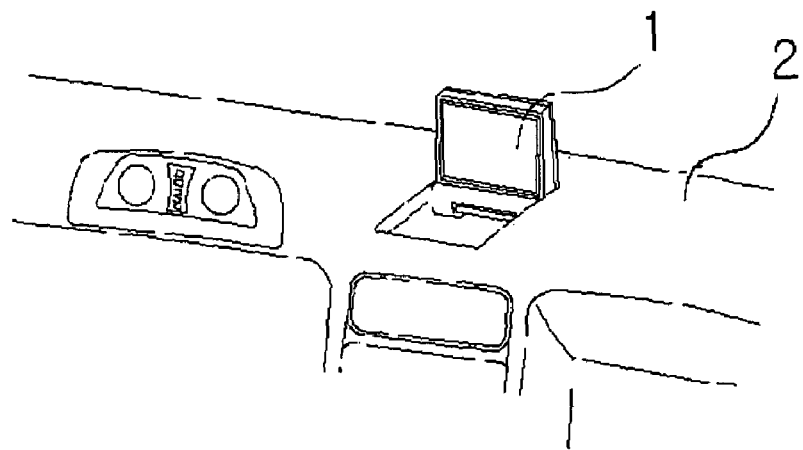

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 4:
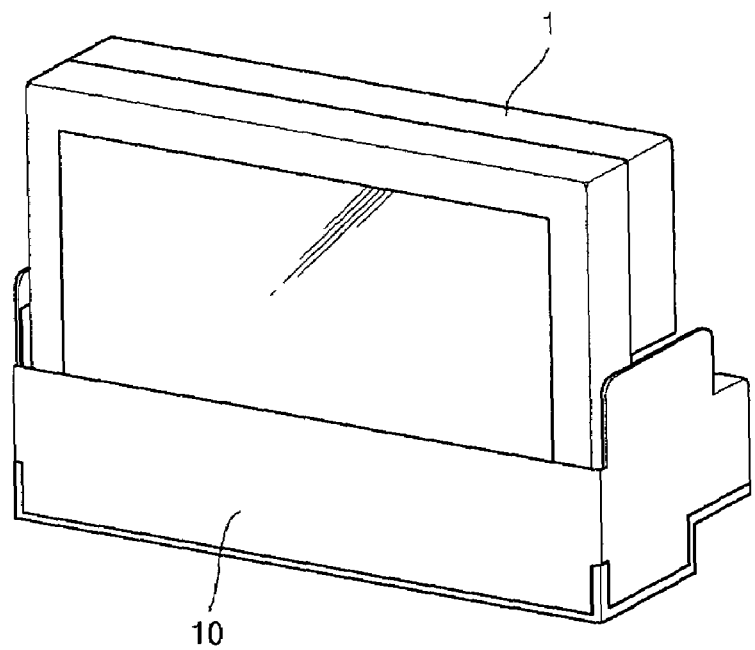
FIG. 4 is a perspective view illustrating an outer appearance of a monitor mounting structure for a vehicle in accordance with an embodiment of the present invention.
Figure 5:
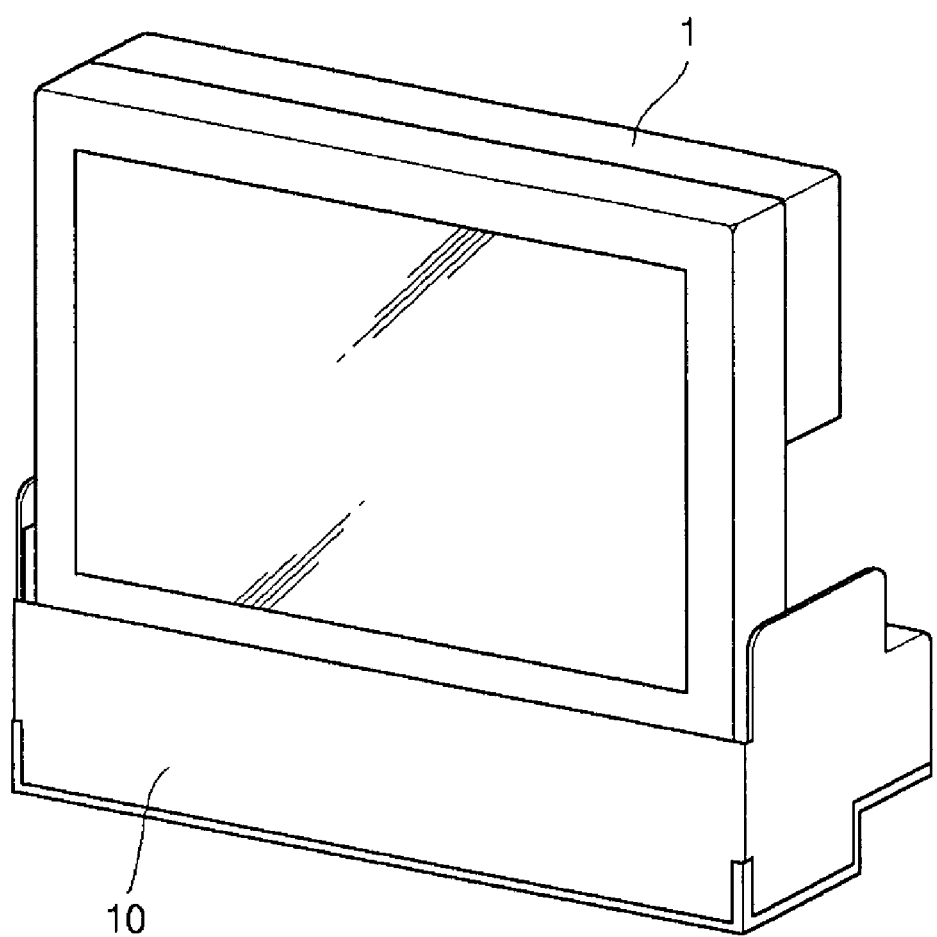
FIG. 5 is a perspective view illustrating an in-use state of the monitor mounting structure for a vehicle according to the present invention.

FIG. 4 is a perspective view illustrating an outer appearance of a monitor mounting structure for a vehicle in accordance with an embodiment of the present invention. While a monitor is not used, the lower portion of the monitor 1 is covered by a cover 10 as shown in FIG. 4. FIG. 5 is a perspective view illustrating an in-use state of the monitor mounting structure for a vehicle according to the present invention.

Figure 6A:
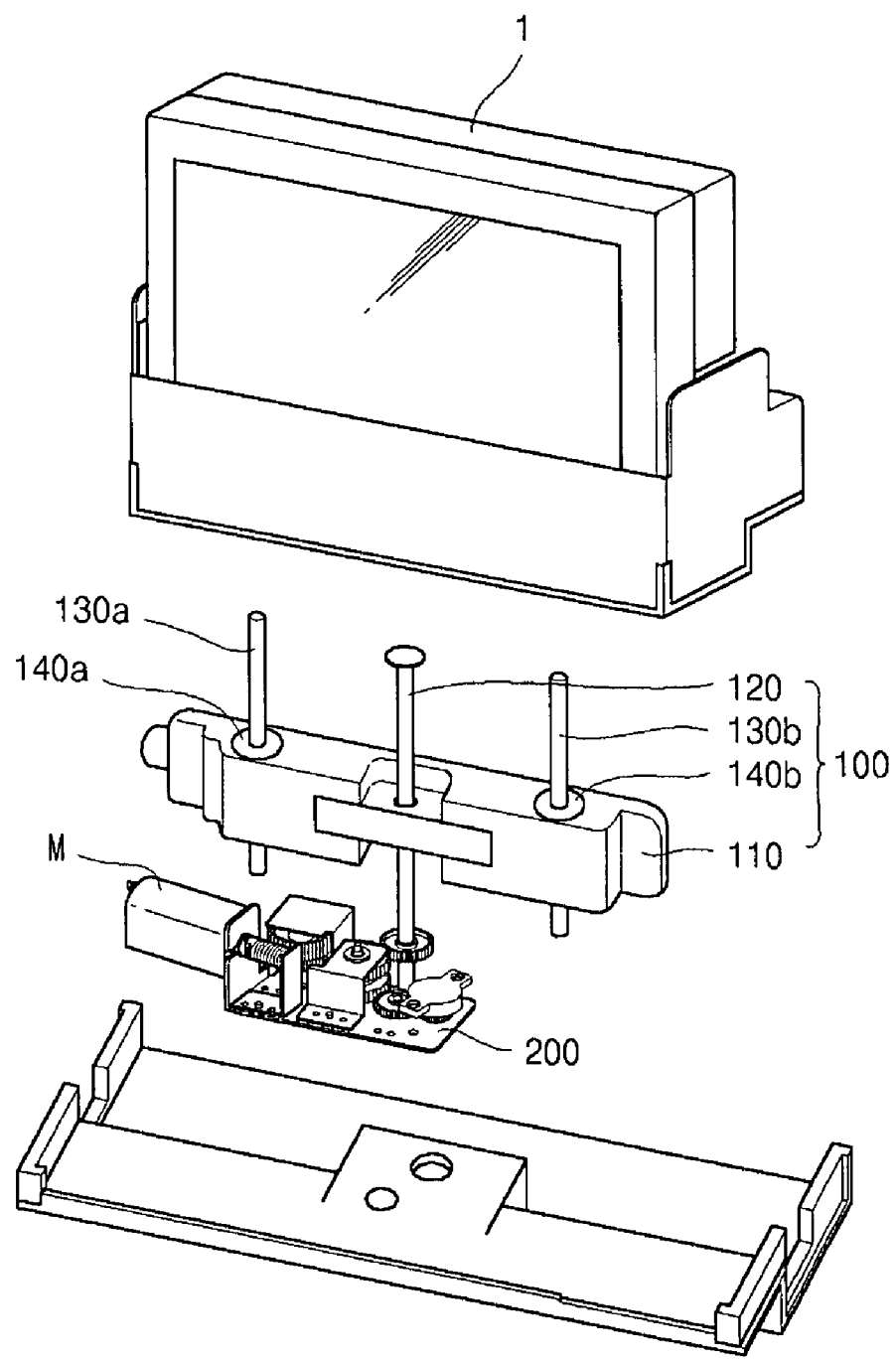
FIG. 6a is an exploded perspective view illustrating an assembly relationship between an operation section and a gear section which are used in the present invention.
Figure 6B:
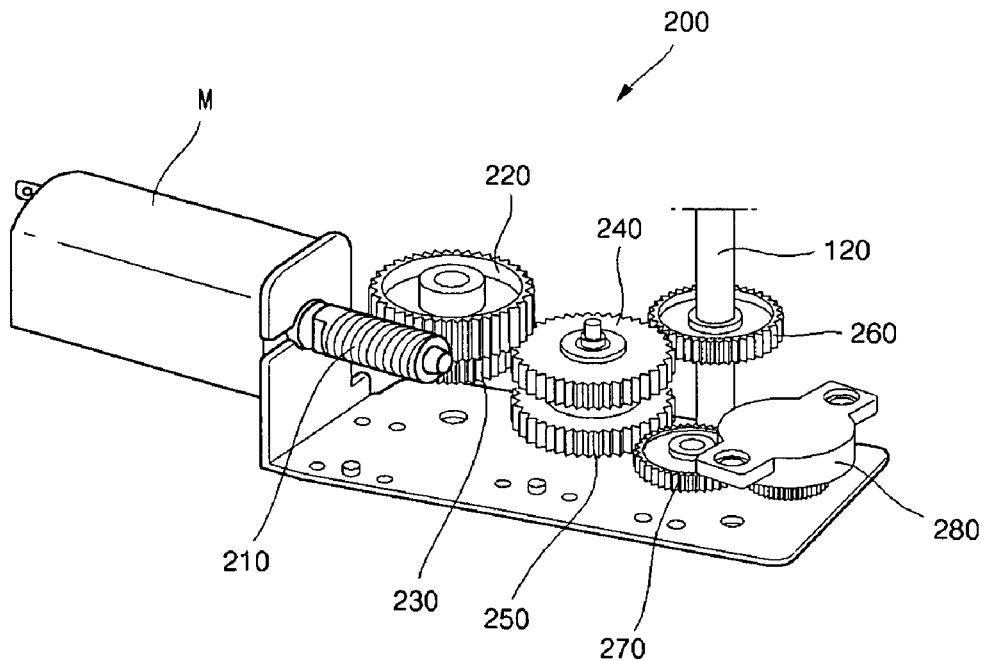
FIG. 6b is a perspective view illustrating the construction of the gear section used in the present invention.

FIG. 6a is a perspective view illustrating the construction of a driving section of the A/V monitor mounting structure for a vehicle according to the present invention. If power is applied to a motor M through manipulation of a switch by a user, the motor M is driven, and the monitor 1 is upwardly moved to be positioned above the cover 10, by which a driver and/or a passenger can watch video displayed on the monitor 1.

In order to limit the upward movement of the monitor 1 to a certain range, it is preferred that a separate component element such as a stopper is formed behind the monitor 1, or a moving distance of the monitor 1 is sensed and the operation of the motor M is interrupted when the monitor 1 is upwardly moved through a predetermined distance.

After watching video through the monitor 1, the motor M is rotated in a reverse direction through manipulation of the switch by the user, by which the monitor 1 is lowered.

The raising and lowering operations of the monitor 1 as described above will be explained below in detail.

If power is externally applied to the motor M through manipulation of the switch by the user, the motor M is rotated. A worm gear 210 is installed on the rotation shaft of the motor M. Therefore, as the motor M is rotated, the worm gear 210 is integrally rotated, and a worm wheel 220 meshed with the worm gear 210 is rotated as well.

A first spur gear 230 is installed on the rotation shaft of the worm wheel 220. At the same time as the worm wheel 220 is rotated, the first spur gear 230 is rotated, and a second spur gear 240 meshed with the first spur gear 230 is rotated. Further, a third spur gear 250, which is installed along with the second spur gear 240 on the same shaft, is rotated integrally with the second spur gear 240.

The second spur gear 240 is meshed with a fourth spur gear 260, and the third spur gear 250 is meshed with a fifth spur gear 270. Due to this fact, through the rotation of the fourth and fifth spur gears 260 and 270, the raising and lowering operations of an operation section 100 which is connected to the monitor 1 are implemented.

A monitor fastening member 110, which is formed in the shape of a rectangular parallelepiped, is installed on the lower end of the rear part of the monitor 1. A moving rod 120 is installed through the center portion of the monitor fastening member 110 to extend in the vertical direction. The fourth spur gear 260 is fixedly installed on the lower end of the moving rod 120. The moving rod 120 is threadedly coupled through the center portion of the monitor fastening member 110. Consequently, as the fourth spur gear 260 is rotated, the moving rod 120 is integrally rotated. By the rotation of the moving rod 120, the monitor fastening member 110 which is threadedly coupled with the moving rod 120 can be raised and lowered.

In order to prevent the monitor 1 from being fluctuated while the monitor fastening member 110 is raised and lowered, first and second balance rods 130a and 130b are installed through both ends of the monitor fastening member 110. While the upper ends of the first and second balance rods 130a and 130b are secured to the monitor 1, the other portions of the first and second balance rods 130a and 130b are not secured to the monitor fastening member 110 and only pass through first and second through-holes 140a and 140b which are defined through the monitor fastening member 110.

At this time, the moving rod 120 and the first and second balance rods 130a and 130b are installed parallel to one another. The separation between the moving rod 120 and the first balance rod 130a is the same as that between the moving rod 120 and the second balance rod 130b to prevent the monitor 1 from being fluctuated while the monitor 1 is raised and lowered.

Also, in order to prevent the monitor 1 from being fluctuated, it is preferred that the outer diameters of the first and second balance rods 130a and 130b substantially correspond to the inner diameters of the first and second through-holes 140a and 140b.

When the movement of the monitor 1 is abruptly interrupted in the course of raising and lowering the monitor 1 through operations of the component elements described above, noise may be generated. At this time, since the user may erroneously consider the situation as a disordered state of the monitor, it is preferred that a clutch mechanism operate to suppress noise generation.

The clutch mechanism used in the present invention operates as described below.

Figure 7:
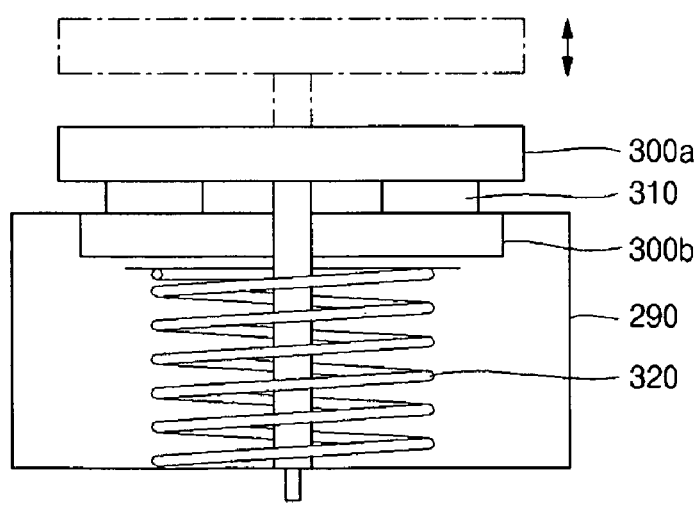
FIG. 7 is a schematic cross-sectional view illustrating the construction of a clutch section used in the present invention.

Due to the fact that the fifth spur gear 270 is meshed with an upper rotation gear 300a of a clutch section 280, as the fifth spur gear 270 meshed with the third spur gear 250 is rotated, the upper rotation gear 300a is rotated. As can be readily seen from FIG. 7, the upper rotation gear 300a is moved upwards and downwards while being rotated.

Accordingly, as the upper rotation gear 300a is moved downward and is brought into contact with the upper end of a friction clutch 310, rotation force is applied to a lower rotation gear 300b through the friction clutch 310. At this time, as frictional contact force increases between the upper end of a spring 320 wound on the rotation shaft of the lower rotation gear 300b and the lower surface of the lower rotation gear 300b, the rotational velocity of the lower rotation gear 300*b* is decreased. As a result, the rotational velocities of the upper rotation gear 300*a* and the fifth spur gear 270 are decreased due to the decrease in the rotational velocity of the lower rotation gear 300*b*, whereby a downward moving velocity of the monitor 1 is retarded and noise generation is suppressed.

Also, if the upper rotation gear 300*a* is raised through the rotation of the fifth spur gear 270, the lower rotation gear 300*b* is simultaneously raised by virtue of the elastic force of the spring 320. At this time, due to frictional contact between the friction clutch 310 and the upper rotation gear 300*a* on the lower rotation gear 300*b*, the rotational velocities of the upper rotation gear 300*a* and the fifth spur gear 270 are decreased to suppress noise generation during upward movement of the monitor 1.

As is apparent from the above descriptions, the A/V monitor mounting structure for a vehicle according to the present invention provides advantages in that a monitor for a vehicle can be raised and lowered to be extended out of and retracted into a crash pad and noise generation is minimized while the monitor is retracted into the crash pad.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An A/V monitor mounting structure for a vehicle, comprising:
    a motor driven in a clockwise or counterclockwise direction when power is applied thereto from an external power source;
    an operation section installed on a lower end of a rear surface of a monitor to raise and lower the monitor;
    a gear section for transmitting power from the motor to the operation section; and
    a clutch section for retarding a moving velocity of the monitor when the monitor is moved upward and downward;
    wherein the gear section comprises a worm gear installed on a rotation shaft of the motor, a worm wheel meshed with the worm gear, a first spur gear installed along with the worm wheel on the same shaft, a second spur gear meshed with the first spur gear, a third spur gear installed along with the second spur gear on the same shaft to be rotated integrally therewith, a fourth spur gear installed on a rotation shaft of the operation section and meshed with the second spur gear to transmit rotation force to the rotation shaft of the operation section, and a fifth spur gear meshed with the third spur gear to transmit rotation force to the clutch section.

2. An A/V monitor mounting structure for a vehicle, comprising:
    a motor driven in a clockwise or counterclockwise direction when power is applied thereto from an external power source;
    an operation section installed on a lower end of a rear surface of a monitor to raise and lower the monitor;
    a gear section for transmitting power from the motor to the operation section; and
    a clutch section for retarding a moving velocity of the monitor when the monitor is moved upward and downward;
    wherein the clutch section comprises an upper rotation gear meshed with the fifth spur gear of the gear section to be rotated and moved upward and downward, a lower rotation gear installed along with the upper rotation shaft on the same shaft to receive rotation force from the upper rotation gear through a friction clutch and to thereby be rotated, and a spring installed on the rotation shaft of the lower rotation shaft to apply elastic force to the lower rotation gear.

\* \* \* \* \*